(12) United States Patent
Dibiaso et al.

(10) Patent No.: US 7,773,697 B2
(45) Date of Patent: Aug. 10, 2010

(54) METHOD TO DEMODULATE AMPLITUDE OFFSETS IN A DIFFERENTIAL MODULATION SYSTEM

(75) Inventors: Eric A. Dibiaso, Kokomo, IN (US); Michael L. Hiatt, Jr., Weatfield, IN (US); Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 1046 days.

(21) Appl. No.: 11/088,129

(22) Filed: Mar. 23, 2005

(65) Prior Publication Data

US 2006/0215790 A1  Sep. 28, 2006

(51) Int. Cl.
*H04L 27/22* (2006.01)

(52) U.S. Cl. .................. 375/329; 375/330; 375/283; 375/279; 375/244

(58) Field of Classification Search .............. 375/329, 375/330, 283, 279, 244, 260, 308, 211, 298, 375/299; 455/403, 12.1, 101, 102, 110; 370/204, 370/206, 210, 230, 232, 256, 321, 328
See application file for complete search history.

(56) References Cited

U.S. PATENT DOCUMENTS

| 5,493,584 | A | * | 2/1996 | Emeott ..................... 375/224 |
| 5,757,821 | A | * | 5/1998 | Jamal et al. ................. 714/746 |
| 5,771,224 | A | * | 6/1998 | Seki et al. .................. 370/206 |
| 7,016,425 | B1 | * | 3/2006 | Kraiem ..................... 375/261 |
| 7,061,997 | B1 | * | 6/2006 | Eberlein et al. ............. 375/332 |
| 7,079,585 | B1 | * | 7/2006 | Settle et al. ................. 375/261 |
| 7,123,875 | B1 | * | 10/2006 | Marko et al. ................ 455/3.02 |

* cited by examiner

*Primary Examiner*—Shuwang Liu
*Assistant Examiner*—Helene Tayong
(74) *Attorney, Agent, or Firm*—Jimmy L. Funke

(57) ABSTRACT

Where the additional data throughput is added using an amplitude offset or a combination of phase and amplitude offset, the legacy differential demodulator does not recover the amplitude information. The present invention provides a method for demodulating amplitude offsets in a differential modulation system in order to recover the amplitude information. The demodulated amplitude information may be used to recover the additional Level 2 data transmitted as an amplitude offset or combination phase and amplitude offset in a differential multiple phase shift keying (D-MPSK) transmission, such as across adjacent OFDM symbols and/or adjacent frequency subcarriers.

16 Claims, 5 Drawing Sheets

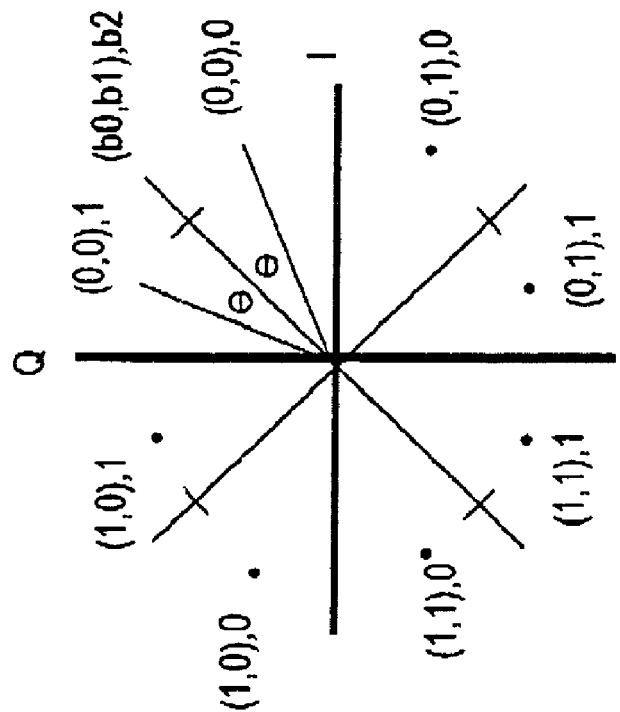
Figure 4. Non-Gray Coded
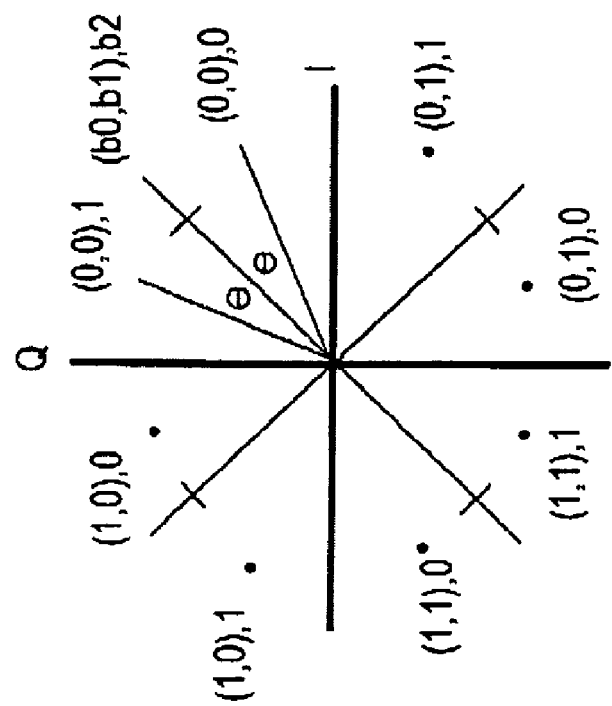
Figure 5. Gray Coded

METHOD TO DEMODULATE AMPLITUDE OFFSETS IN A DIFFERENTIAL MODULATION SYSTEM

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated 25 megahertz (MHz) of the electromagnetic spectrum for satellite digital broadcasting, 12.5 MHz of which are owned by XM Satellite Radio, Inc. of Washington, D.C. ("XM"), and 12.5 MHz of which are owned by Sirius Satellite Radio, Inc. of New York City, N.Y. ("Sirius"). Both companies provide subscription-based digital audio that is transmitted from communication satellites, and the services provided by these—and eventually other—companies (i.e., SDAR companies) are capable of being transmitted to both mobile and fixed receivers on the ground.

In the XM satellite system, two (2) communication satellites are present in a geostationary orbit—one satellite is positioned at longitude 115 degrees (west) and the other at longitude eighty-five (85) degrees (east). Accordingly, the satellites are always positioned above the same spot on the earth. In the Sirius satellite system, however, three (3) communication satellites are present that all travel on the same orbital path, spaced approximately eight (8) hours from each other. Consequently, two (2) of the three (3) satellites are "visible" to receivers in the United States at all times. Since both satellite systems have difficulty providing data to mobile receivers in urban canyons and other high population density areas with limited line-of-sight satellite coverage, both systems utilize terrestrial repeaters as gap fillers to receive and re-broadcast the same data that is transmitted in the respective satellite systems.

Mobile wireless systems operate under unique and challenging channel conditions. Factors such as multipath, intersymbol interference, and Doppler shift make the wireless channel unpredictable. These factors are all related to the variability that is introduced by the mobility of the user and the wide range of environments that might be encountered. Mobile data systems, such as the SDARS system, face challenges such as these as a result of the vagaries of the wireless environment.

SUMMARY OF THE INVENTION

Additional data may be added to a D-MPSK modulation system. There are techniques to add hierarchical modulation to both satellite and terrestrial signals. Most commonly used for stationary systems, these are typically straightforward phase and magnitude adjustments. Some are also designed prior to system deployment, such as terrestrial digital video broadcasting (DVB-T) hierarchical modulation.

In the case where a legacy receiver architecture for a differential modulation system outputs angular/phase differences between carriers, the amplitude information of the differential symbols is lost. The present invention provides a method for demodulating amplitude offsets in a differential modulation system in order to recover the amplitude information. The correct amplitude of each transmitted symbol may be used to recover the additional data throughput encoded as amplitude offsets from the legacy data.

Problems arise when performing similar techniques in mobile applications. Problems that might arise include multipath, intersymbol interference (ISI), and Doppler shift. Multipath refers to the phenomenon that occurs as a transmitted signal is reflected by objects in the environment between the transmitter and the user. While the signal is en route, walls, chairs, desks, and other items get in the way and cause the signal to bounce in different directions. A portion of the signal might go directly to the destination, and another part may bounce from a chair to the ceiling, and then to the destination. As a result, some of the signal will encounter delay and travel longer paths to the receiver resulting in random signal fades.

Intersymbol interference (ISI) describes the situation where the energy from one symbol spills over into another symbol resulting in signal fades. ISI is caused by the frequency selectivity (time dispersion) of the channel due to multipath propagation. Doppler shift describes the random changes in the channel introduced as a result of a user's mobility and the relative motion of objects in the channel. Doppler has the effect of shifting, or spreading, the frequency components of a signal resulting in signal fades.

Some terrestrial audio broadcast systems use differential multiple phase shift keying (D-MPSK) modulation (e.g., D-BPSK, D-QPSK, pi/4 D-QPSK). Standard differential modulation techniques like D-MPSK encode the data in the phase difference between two consecutive PSK symbols. A D-MPSK modulation technique may be accomplished by transmitting the phase information across adjacent orthogonal frequency-division multiplexing (OFDM) symbols or adjacent frequency subcarriers. OFDM works by splitting the radio signal into multiple smaller sub-signals that are then transmitted simultaneously at different frequencies to the receiver. OFDM reduces interference in signal transmissions. In an OFDM system the differential modulation may be across adjacent frequency subcarriers in one OFDM symbol or on the frequency subcarriers across two adjacent OFDM symbols. In either case, estimates due to phase offsets may be used to improve performance.

Additional data may be added to the current SDARS satellite signals as a phase offset from the legacy quadrature phase shift keying (QPSK) modulated data transmitted by the SDAR satellites. This additional data (along with the legacy data) is then demodulated by the terrestrial repeaters. The additional data may then be encoded as an offset to the legacy OFDM signal of the repeater. This offset can be amplitude, phase, or a combination of both.

However, in the case where a legacy receiver architecture for a differential modulation system outputs angular/phase differences between carriers, the amplitude information of the differential symbols is lost. The present invention provides a method for demodulating amplitude offsets in a differential modulation system in order to recover the amplitude information. The correct amplitude of each transmitted symbol may be used to recover the Level 2 data encoded as amplitude offsets from the legacy data.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIGS. 4 and 5 are quadrature diagrams depicting the modulation techniques for adding additional data as a signal offset.

Figure 1:
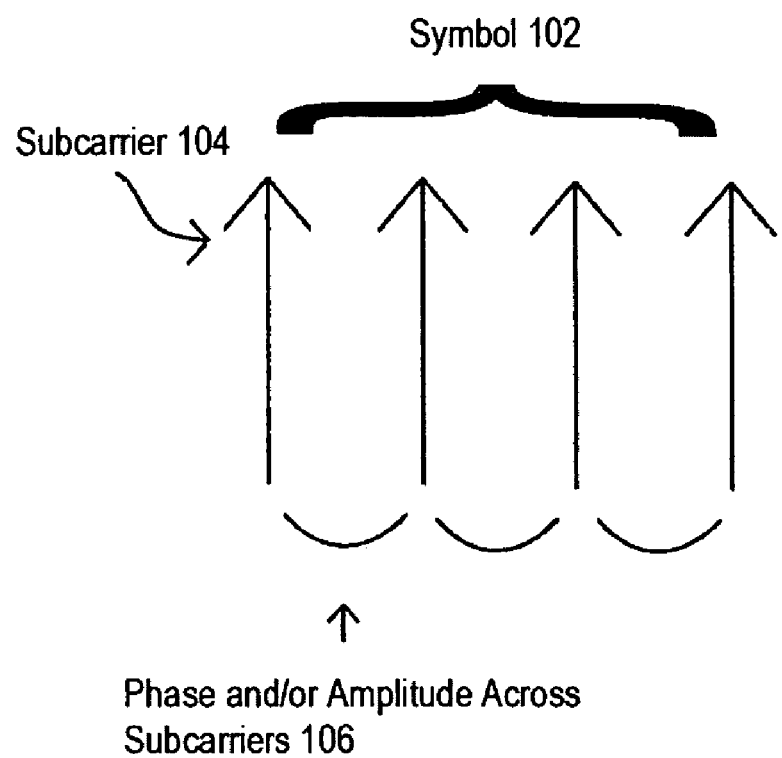
FIG. 1 is a schematic diagram of a technique for adding additional throughput by transmitting the phase and/or amplitude information across adjacent frequency subcarriers.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted accordance with the following definitions.

"Orthogonal frequency division multiplexing" or "OFDM" hereinafter refers to the communications technique that divides a communications channel into a number of equally spaced frequency bands. Multiple subcarriers each carry a portion of the transmitted data. Each subcarrier is orthogonal to every other subcarrier, which minimizes the interference between them.

"Phase shift keying" or "PSK" hereinafter refers to a method of transmitting and receiving digital signals in which the phase of a transmitted signal is varied to convey information. Phase may also be an expression of relative displacement between or among waves having the same frequency.

"Quadrature phase shift keying" or "QPSK" hereinafter refers to a digital frequency modulation technique that is both easy to implement and fairly resistant to noise. With QPSK, the carrier undergoes four changes in phase (four symbols) and can thus represent two binary bits of data per symbol. Although this may seem insignificant initially, a modulation scheme has now been proposed that enables a carrier to transmit three bits of information per symbol instead of two, thus effectively increasing the bandwidth of the carrier by 1.5.

"Hierarchical modulation" hereinafter describes a method in which two separate data or bit streams are modulated onto a single data stream by superimposing an additional data stream upon, mapped on, or embedded within the primary data transmission. The additional data stream may have a different data rate than the primary data stream. As such, the primary data is more susceptible to noise than it would be in a non-hierarchical modulation scheme. The usable data of the additional stream may be transmitted with a different level of error protection than the primary data stream. Broadcasters of SDAR services may use the additional and primary data streams to target different types of receivers.

"First level data," "primary data" or "Level 1 data" hereinafter refers to existing data that may be interpreted by current (i.e., "legacy") SDAR receivers. Because the first level data can be interpreted by the legacy receivers, the first level data may also be considered to have backwards compatibility.

"Second level data," "secondary data," "Level 2 data," and/or "hierarchical data" hereinafter refers to the additional data that is superimposed on the first level data to create a hierarchically modulated data stream. Second level data may be interpreted by SDAR receivers containing the appropriate hardware and/or software to enable such interpretation (i.e., "second generation" receivers). Second level, or secondary, data may perform differently from first level, or primary, data.

Additional data throughput (i.e., secondary data) may be added in a D-MPSK hierarchical modulation system by adding an offset to the primary signal transmitted by a conventional SDARS terrestrial repeater. A primary signal having differential multiple phase shift keying (D-MPSK) modulation may be received and a secondary signal added to symbols from the D-MPSK modulated signal as an offset to produce an offset signal. The offset signal may then be transmitted using an orthogonal frequency-division multiplexing (OFDM) transmission system. Where the additional data throughput is added using an amplitude offset or a combination phase and amplitude offset, the amplitude information is lost. The present invention provides a method for demodulating amplitude offsets in a differential modulation system in order to recover the amplitude information.

The adding of additional throughput to Level 2 data by transmitting the phase and/or amplitude information across adjacent frequency subcarriers is depicted in a schematic format as shown in FIG. 1. OFDM works by splitting the radio signal into multiple smaller sub-signals that are then transmitted simultaneously at different frequencies to the receiver. In an OFDM system the differential modulation may be across adjacent frequency subcarriers 106 in one OFDM symbol 102. Estimates due to phase offsets may be used to improve performance.

In one exemplary embodiment, the legacy signal that has been quadrature phase shift keying (QPSK) modulated by two bits per symbol may be received and the Level 2 offset may be added to the symbols as a phase offset from the QPSK modulated data. Differential multiple phase shift keying (D-MPSK) is then accomplished by transmitting the phase information across adjacent frequency subcarriers in an OFDM system.

The implementation of a phase offset between two frequency subcarriers has shown through simulations to produce the least degradation to the legacy system. Details of this exemplary implementation are shown in the following example. The example depicts this method on a pi/4 D-QPSK system. The original Level 1 bits and their corresponding constellation mapping are show below:

|  | Level 1 bits | | | |
|---|---|---|---|---|
|  | 10 | 11 | 00 | 01 |
| QPSK symbols | 135° | −135° | 45° | −45° |
|  | Pi/4 D-QPSK symbols | | | |
|  | #1(ref) | #2 | #3 | #4 | #5 |
| (Dsym) | 45° | 180° | 45° | 90° | 45° |

The above symbols would be transmitted in the legacy system. Level 1 bits are the two bits intended to be transmitted. QPSK symbols indicate the associated phase shift. The modulation used is pi/4 shifted Differential Quadrature Phase Shift Keying (pi/4-D-QPSK). In conventional QPSK there are four possible constellation points and the phase change can be 0, ±pi/2 or pi. In pi/4 DQPSK modulation, there are eight possible constellation points. Dsym specifies a symbol has been defined. To add the additional data (Level 2) to the transmission, the following steps are performed:

| | Level 2 bits | | | |
|---|---|---|---|---|
| | 0 | 0 | 1 | 0 |
| Level 2 symbol (offset) | −15° | −15° | +15° | −15° |

A +/−15 degree offset from the original QPSK symbol is expected to provide the best performance in this embodiment, although there are variations in optimal performance depending on hardware and software implementations of the present invention. Therefore, the following equations have been developed to give a +/−15 degree offset for Differential Modulation:

Tsym(1)=Dsym(1) (reference)

Tsym(n)=Dsym(n)−Dsym(n−1)+offset+Tsym(n−1); for n=2:# of subcarriers

Tsym represents the transmitted symbol. The first equation represents a reference point for the first subcarrier. The second equation gives a +/−15 degree offset for Differential Modulation for the remaining subcarriers.

The following example shows the new transmitted symbols calculated from the above equation:

| | Pi/4 D-QPSK symbols | | | | |
|---|---|---|---|---|---|
| | #1(ref) | #2 | #3 | #4 | #5 |
| (Tsym) | 45° | 165° | 15° | 75° | 15° |

At the receiver (without noise), the differential demodulator would output the following symbols (#2-#1 . . . ):

| | Received symbols | | | |
|---|---|---|---|---|
| | 120° | −150° | 60° | −60° |
| Error from QPSK symbols | −15° | −15° | +15° | −15° |

As shown above, the error from the received QPSK symbols exactly matches the Level 2 phase offset added at the transmitter. This method is thought to produce the smallest degradation to the original pi/4 D-QPSK data in this embodiment.

The performance of the additional data may be improved by modifying the Level 2 bit mapping method shown in the example. The mapping above was simply:

| Level 2 Bit | Phase Offset |
|---|---|
| 0 | −15° |
| 1 | +15° |

A final constellation where the Level 2 bits (b2) are not gray coded as shown in FIG. 4. For Level 2 gray coding, the mapping technique as shown in FIG. 5 may be used. In the above example, the mapping technique optimizes the performance of the additional data.

| Level 2 Bit | Dsym(n) − Dsym(n − 1) | Phase Offset |
|---|---|---|
| 0 | 45°, −135° | −15° |
| 0 | 135°, −45° | +15° |
| 1 | 45°, −135° | +15° |
| 1 | 135°, −45° | −15° |

Figure 2:
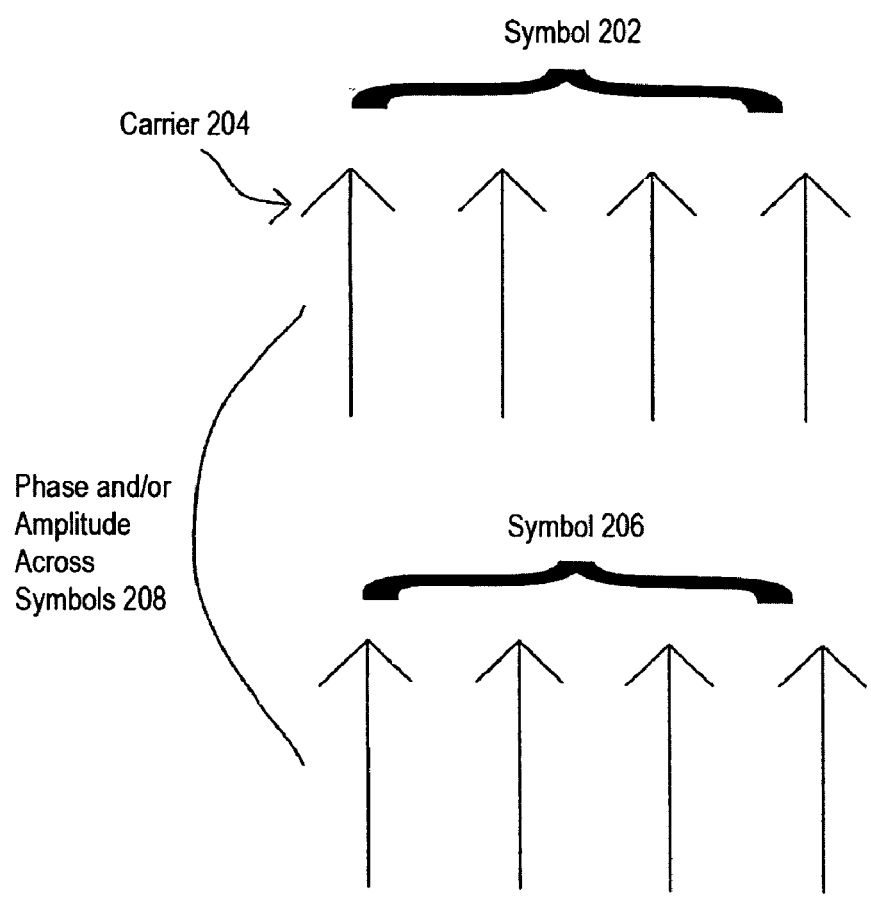
FIG. 2 is a schematic diagram of a technique for adding additional throughput by transmitting the phase and/or amplitude information across adjacent OFDM symbols.

The transmission of the additional data may be accomplished, for example, by transmitting the phase information across adjacent orthogonal frequency-division multiplexing (OFDM) symbols, as depicted in FIG. 2. The Level 2 offset is added to the symbols as a phase offset from the legacy QPSK modulated data. Differential multiple phase shift keying (D-MPSK) is then accomplished by transmitting the phase information across adjacent OFDM symbols in an OFDM system. FIG. 2 depicts the phase and/or amplitude information 208 being transmitted across adjacent OFDM symbols 202 and 206.

The transmission of the additional data may be done as an amplitude offset between the same frequency subcarriers on two adjacent OFDM symbols or between adjacent subcarriers on the same OFDM symbol. The implementation of the amplitude offset is similar to the phase offset except for the exceptions highlighted below.

To identically compare the phase and amplitude offset methods, the offset distance was calculated using the following equation: Amplitude offset=sin(phase offset). The major difference is the mapping of the Level 2 bits. The amplitude remains the same if the Level 2 bit is a zero, and it toggles if the Level 2 bit is a one, as shown below.

| Level 2 Bit | Amplitude of Tsym(n − 1) | Amplitude of Tsym(n) |
|---|---|---|
| 0 | −Amplitude Offset | −Amplitude Offset |
| 0 | +Amplitude Offset | +Amplitude Offset |
| 1 | −Amplitude Offset | +Amplitude Offset |
| 1 | +Amplitude Offset | −Amplitude Offset |

A combination of the two methods (phase offset and amplitude offset) described above may be used to add the additional data throughput to the signal transmitted by a SDARS terrestrial repeater. This technique further degrades the performance of the Level 1 legacy data (by decreasing Level 1 symbol energy), but will increase the performance of the Level 2 data (by increasing Level 2 symbol energy). This technique may be accomplished by transmitting the same Level 2 information twice (both with amplitude and phase offset) and combining them in the receiver. The combining may be done using Maximum Ratio Combining (MRC) or by utilizing some type of complementary code on the Level 2 data. By using a complementary code, different parity bits may be transmitted with the amplitude and phase offsets and combined in the decoder to improve the error correction capability of the code.

The described techniques may be utilized to minimize degradation in adding additional data to a D-MPSK hierarchical modulation. The techniques provide for adding the additional throughput to the Level 2 data by transmitting the phase information across adjacent OFDM symbols or adjacent frequency subcarriers. The techniques are shown using the flow diagrams in FIGS. 3A and 3B.

Figure 3A:
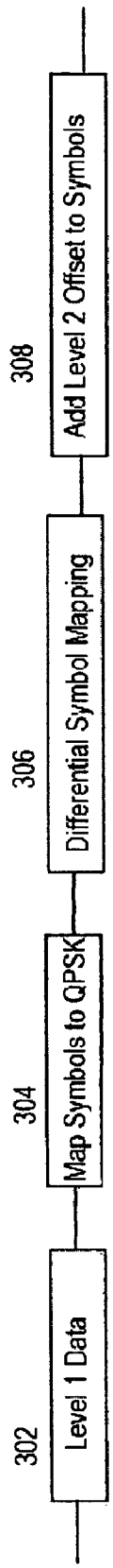
FIGS. 3A and 3B are flow chart diagrams of a techniques for adding additional throughput to a legacy signal.

In FIG. 3A, the primary Level 1 data 302 may be mapped to symbols using quadrature phase shift keying (QPSK) modulation (step 304). The symbols may then be differentially modulated (step 306). The additional data may be accomplished by adding a secondary signal to symbols from the D-MPSK modulated signal as an offset to produce an offset signal (step 308).

Figure 3B:
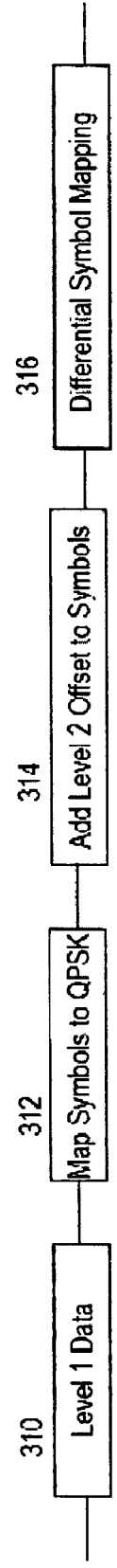

The technique depicted in FIG. 3B is similar. The primary Level 1 data 310 may be mapped to symbols using quadrature phase shift keying (QPSK) modulation (step 312). The additional data may be accomplished by adding a secondary signal to symbols from the QPSK modulated signal as an offset to produce an offset signal (step 314). The offset signal may then be differentially modulated and transmitted in, for example, an orthogonal frequency-division multiplexing (OFDM) transmission system (step 316).

Figure 6:
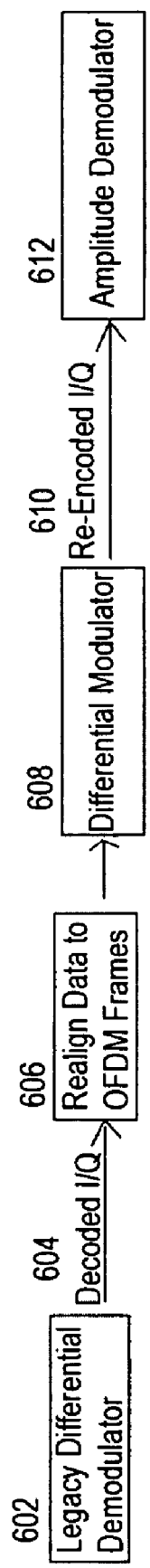
FIG. 6 is a quadrature diagram depicting the demodulation technique of the present invention.

The above techniques may be utilized in adding additional data to a D-MPSK hierarchical modulation. The techniques provide for adding the additional throughput to the Level 2 data by transmitting the phase information across adjacent OFDM symbols or adjacent frequency subcarriers. The transmission of the additional data may also be done as an amplitude offset between the same frequency subcarriers on two adjacent OFDM symbols or between adjacent subcarriers on the same OFDM symbol. A third option involves the use of a combination of the two methods (phase offset and amplitude offset) in transmitting the additional Level 2 data.

Where the additional data throughput is added using an amplitude offset or a combination phase and amplitude offset, the amplitude information cannot be recovered by the legacy differential demodulator. The present invention provides a receiver and method for demodulating amplitude offsets in a differential modulation system in order to recover the amplitude information, as depicted in FIG. 6. The correct amplitude of each transmitted symbol may be used to recover the additional (Level 2) data throughput encoded as amplitude offsets from the legacy data.

In one embodiment of the present invention, the receiver includes legacy differential demodulator 602 which first demodulates the received differential multiple phase shift keying (D-MPSK) modulated symbols with amplitude information that have been transmitted in an orthogonal frequency-division multiplexing (OFDM) transmission system thereby producing decoded I/Q 604 (i.e., data symbols in the rectangular form with in-phase (I) and quadrature (Q) signals). The next step 606 is to properly align the demodulated data with the reference subcarriers. Next, the data may be differentially encoded (similar to the transmitter) by differential modulator 608 to recover the original soft, or multi-leveled, symbol data before differential demodulation. Amplitude demodulator 612 may then determine the correct amplitude of each transmitted symbol in order to recover the Level 2 data encoded as amplitude offsets from the legacy data symbols.

In another embodiment of the present invention, a properly configured second-generation receiver may recover the amplitude information when the additional data throughput is added using a combination phase and amplitude offsets to the legacy data. Again, the correct amplitude of each transmitted symbol is detected in order to recover the Level 2 data encoded as an offset to the legacy data. This involves designing a second-generation receiver that has an amplitude offset detector as part of the differential demodulator (thus combining legacy differential demodulator 602 and amplitude demodulator 612).

While this invention has been described as having an exemplary design, the present invention may be further modified within the spirit and scope of this disclosure and applied to a variety of differential modulation transmission schemes. This application is therefore intended to cover any variations, uses, or adaptations of the invention using its general principles. Further, this application is intended to cover such departures from the present disclosure as come within known or customary practice in the art to which this invention pertains.

We claim:

1. A method for demodulating amplitude offsets in a digital transmission system, comprising the steps of:
   a. receiving differential multiple phase shift keying (D-MPSK) modulated symbols comprising Level 1 data, and Level 2 data as amplitude offset information in a hierarchical modulation digital transmission system;
   b. differentially demodulating D-MPSK modulated symbols to decode the Level 1 data, wherein demodulated data is aligned with reference subcarriers;
   c. differentially remodulating the differentially demodulated D-MPSK modulated symbols to recover original soft, or multi-leveled, symbol data; and
   d. demodulating the Level 2 data modulated as the amplitude offsets from the differentially remodulated D-MPSK symbols.

2. The method of claim 1 further comprising the step of:
   a. determining amplitude offsets from original soft symbol data.

3. The method of claim 1 further comprising the step of:
   a. demodulating Level 2 data modulated as phase and amplitude offsets from the differentially remodulated D-MPSK modulated data.

4. The method of claim 1 wherein the step (a) receives a signal transmitted in an orthogonal frequency-division multiplexing (OFDM) transmission system.

5. The method of claim 1, wherein the differentially remodulated D-MPSK modulated symbols of step (c) is substantially the same as the received D-MPSK modulated symbols of step (a).

6. The method of claim 1, wherein the Level 2 data is different than the Level 1 data, such that the Level 2 data is not used for error correction.

7. The method of claim 1, wherein the Level 2 data appears as noise to a legacy receiver, and the Level 2 data is demodulated by a second generation receiver.

8. An apparatus for demodulating amplitude offsets in a digital transmission system, said apparatus comprising:
   a. a digital transmission receiver of a hierarchical modulation digital transmission system adapted to detect differential multiple phase shift keying (D-MPSK) modulated symbols comprising Level 1 data, and Level 2 data modulated as amplitude offsets;
   b. a differential demodulator adapted to demodulate D-MPSK modulated symbols to decode the Level 1 data, wherein demodulated data is aligned with reference subcarriers;
   c. a differential modulator adapted to remodulate the demodulated D-MPSK modulated symbols to recover original soft, or multi-leveled, symbol data; and d. an amplitude offset demodulator, wherein the offset demodulator demodulates the Level 2 data modulated as the amplitude offsets from the differentially remodulated D-MPSK symbols.

9. The apparatus of claim 8 further comprising:
a. circuitry coupled to the differential modulator, the circuitry adapted to recover original soft symbol data, determine correct phase and amplitude offsets from original soft symbol data; and demodulate Level 2 data modulated as phase and amplitude offsets from D-MPSK remodulated data.

10. The apparatus of claim 8, wherein the differentially remodulated D-MPSK modulated symbols of step (c) is substantially the same as the received D-MPSK modulated symbols of step (a).

11. The apparatus of claim 8, wherein the Level 2 data is different than the Level 1 data, such that the Level 2 data is not used for error correction.

12. The apparatus of claim 8, wherein the Level 2 data appears as noise to a legacy receiver, and the Level 2 data is demodulated by a second generation receiver.

13. An apparatus for modulating amplitude offsets in a digital transmission system, said apparatus comprising:
a. a digital transmitter of a hierarchical modulation digital transmission system adapted to transmit differential multiple phase shift keying (D-MPSK) modulated symbols comprising Level 1 data; and
b. an amplitude offset modulator adapted to provide D-MPSK modulated symbols to the transmitter, wherein the amplitude offset modulator is coupled to circuitry that is adapted to modulate Level 2 data as amplitude offsets imposed on the D-MPSK modulated symbols, such that the D-MPSK modulated symbols are demodulated in order to decode the level 1 data, wherein demodulated data is aligned with reference subcarriers, and remodulated to recover original soft, or multi-leveled, symbol data.

14. The apparatus of claim 13 further comprising:
a. circuitry coupled to said amplitude offset modulator, the circuitry adapted to modulate Level 2 data as phase and amplitude offsets imposed on the D-MPSK modulated symbols.

15. The apparatus of claim 13, wherein the D-MPSK modulated symbols comprising Level 1 and Level 2 data is received by a digital transmission receiver of the digital transmission system, the digital transmission receiver comprising:
a. a differential demodulator adapted to demodulate D-MPSK modulated symbols to decode the Level 1 data; and
b. a differential modulator adapted to remodulate the demodulated D-MPSK modulated symbols.

16. The apparatus of claim 13, wherein the Level 2 is different than the Level 1 data, such that the Level 2 data is not used for error correction.

* * * * *